United States Patent [19]

Kawakami et al.

[11] Patent Number: 5,324,814
[45] Date of Patent: Jun. 28, 1994

[54] PRODUCTION PROCESS OF ARYLENE THIOETHER COPOLYMER

[75] Inventors: Yukichika Kawakami, Iwaki; Mitsuru Hoshino; Yoshikatsu Satake, all of Iwaki;, Japan

[73] Assignee: Kureha Kagaku Kogyo K. K., Tokyo, Japan

[21] Appl. No.: 686,972

[22] Filed: Apr. 18, 1991

[30] Foreign Application Priority Data

Apr. 25, 1990 [JP] Japan .................... 2-109480
Mar. 8, 1991 [JP] Japan .................... 3-067609

[51] Int. Cl.$^5$ .................... C08G 75/14; C08F 283/00
[52] U.S. Cl. .................... 528/388; 525/537
[58] Field of Search .................... 528/388; 525/537

[56] References Cited

U.S. PATENT DOCUMENTS

| | | | |
|---|---|---|---|
| 3,919,177 | 11/1975 | Campbell | 528/388 |
| 4,645,826 | 2/1987 | Iizuka et al. | 528/388 |
| 4,960,555 | 10/1990 | Satake et al. | 525/537 |

FOREIGN PATENT DOCUMENTS

| | | |
|---|---|---|
| 2470780 | 6/1981 | France . |
| 45-3368 | 2/1970 | Japan . |
| 45-19713 | 7/1970 | Japan . |
| 46-4398 | 11/1971 | Japan . |
| 53-25589 | 3/1978 | Japan . |
| 61-20017 | 1/1986 | Japan . |
| 61-197634 | 9/1986 | Japan . |
| 62-529 | 1/1987 | Japan . |
| 62-530 | 1/1987 | Japan . |
| 62-20530 | 1/1987 | Japan . |
| 62-91530 | 4/1987 | Japan . |
| 1-248083 | 10/1989 | Japan . |
| 2140233 | 5/1990 | Japan . |
| 47334 | 4/1992 | Japan . |

OTHER PUBLICATIONS

G. Daccord et al. Ponymer Bulletin 6,477–484 (1982).
W. Heitz Makromol. Chem., Macromol. Symp. 26, 1–8 (1989).

Primary Examiner—Melvyn J. Marquis
Attorney, Agent, or Firm—Lowe, Price, LeBlanc & Becker

[57] ABSTRACT

Disclosed herein is a process for the production of an arylene thioether copolymer (C), wherein an alkali metal sulfide is caused to act on a poly(arylene thioether) (A) having predominant recurring units of the formula [I]:

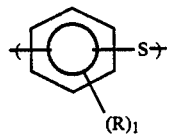

wherein R denotes an alkyl group having 1–6 carbon atoms, and 1 stands for 0 or an integer of 1–4, in a water-containing polar organic solvent so as to depolymerize the poly(arylene thioether) (A), thereby preparing a prepolymer (B) having an alkali thiolate group on at least one terminal thereof and the resultant prepolymer (B) is then subjected to a polymerization reaction with at least one dihalogen-substituted aromatic compound.

10 Claims, No Drawings

PRODUCTION PROCESS OF ARYLENE THIOETHER COPOLYMER

FIELD OF THE INVENTION

This invention relates to a novel process for the production of arylene thioether copolymers, and more specifically to a process for the production of arylene thioether copolymers high in degree of polymerization, excellent in melt stability and low in content of ionic impurities, which comprises depolymerizing a poly(arylene thioether) (hereinafter abbreviated as "PATE") to prepare a prepolymer having an alkali thiolate group on at least one terminal thereof and then reacting the resultant prepolymer with a specific dihalogen-substituted aromatic compound to polymerize them.

This invention is also concerned with a novel process for the preparation of prepolymers having an alkali thiolate group on at least one terminal thereof.

The present invention can provide arylene thioether copolymers having good uniformity of composition by using as starting materials at least two dihalogenated aromatic compounds, which are different from each other in stability and reactivity in the reaction system, and copolymerizing them.

BACKGROUND OF THE INVENTION

Arylene thioether polymers have heretofore been prepared mainly by a process wherein a dihalogen-substituted aromatic compound is reacted with an alkali metal sulfide in a polar organic solvent (for example, Japanese Patent Publication Nos. 3368/1970 and 25589/1978, and U.S. Pat. Nos. 3,919,177 and 4,645,826).

This reaction is represented by the following reaction formula:

wherein Ar means an aromatic residue, M denotes an alkali metal, and X is a halogen atom.

In this preparation process, phenols and amines are formed as by-products due to the reaction of the dihalogen-substituted aromatic compound and alkali metal sulfide at an elevated temperature, and they have an undesirable effect on the polymerization degree and melt stability of the resulting polymer.

When various kinds of dihalogen-substituted aromatic compounds are separately used in the preparation process, they can be divided broadly into the following three groups by relatively evaluating them with respect to stability and reactivity in the polymerization reaction system and solubility in the polymerization solvent.

Group (G1): Standard compounds medium all in reactivity, stability and solubility, which may include, for example, those represented by the following formula:

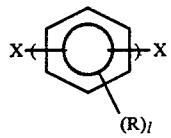

wherein X means a halogen atom, R denotes an alkyl group having 1–6 carbon atoms, and 1 stands for 0 or an integer of 1–4.

Group (G2): Compounds higher in reactivity compared to those of Group (G1) but unstable in the polymerization reaction system, which may include, for example, those represented by the following formulae:

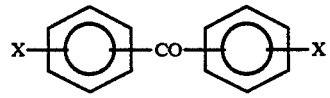

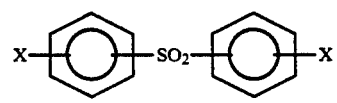

wherein X means a halogen atom.

Group (G3): Compounds poor in solubility in the polymerization solvent, which may include, for example, those represented by the following formula:

When copolymerization between a dihalogen-substituted aromatic compound in Group (G1) and a dihalogen-substituted aromatic compound in Group (G2) or (G3) other than that of Group (G1) was attempted in accordance with the prior art process, it was difficult to obtain any copolymer high in polymerization degree, uniform in composition and/or good in melt stability.

As that reason, there can be mentioned the fact that the dihalogen-substituted aromatic compound of Group (G1) requires to conduct a polymerization reaction at a relatively high temperature for obtaining a polymer of high polymerization degree, while the dihalogen-substituted aromatic compound of Group (G2) is unstable and tends to decompose at such a high temperature and hence, requires to conduct a polymerization reaction at a relatively low temperature for obtaining a polymer of high polymerization degree. In addition, they are substantially different in reactivity from each other, so that any copolymers uniform in composition can not be obtained therefrom.

Besides, in the copolymerization reaction between the dihalogen-substituted aromatic compounds of Group (G1) and (G3), a homopolymer of the dihalogen-substituted aromatic compound of Group (G3) or a copolymer containing such a compound in a great amount tends to precipitate from the polymerization solvent in the initial stage of the reaction, so that any copolymers uniform in composition can not be obtained therefrom.

With a view toward improving the above-mentioned problems in the copolymerization of

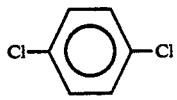

of Group (G1) with

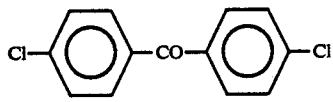

of Group (G2) or

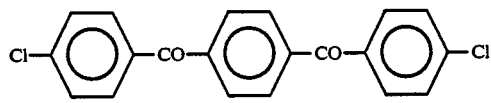

of Group (G2), the present inventors previously proposed a production process of block copolymers by forming respective prepolymers in advance and reacting these prepolymers with each other (Japanese Patent Application Nos. 248083/1989 and 342968/1989). However, it is desirable to obtain copolymers improved further in respect of polymerization degree and melt stability.

As another production process of arylene thioether polymers, there has been proposed a process in which a dihalogen-substituted aromatic compound is reacted with an aromatic dithiol or an alkali metal salt thereof (alkali thiolate) (Japanese Patent Publication Nos. 19713/1970 and 4398/1971, and Japanese Patent Laid-Open Nos. 197634/1986, 200127/1986, 529/1987, 530/1987, 91530/1987 and 20530/1987). This reaction is represented by the following two reaction formulae:

According to this production process, the reactivity is good. However, the aromatic dithiol and alkali thiolate of raw materials are easy to be oxidized, so that the process is accompanied by problems of difficulty in purifying and handling them, increase in production cost and difficulty in industrial practice.

OBJECTS AND SUMMARY OF THE INVENTION

An object of this invention is to provide a process for the stable production of arylene thioether copolymers high in polymerization degree and good in melt stability.

Another object of this invention is to provide prepolymers having at least one reactive terminal group, which are useful as raw materials for such arylene thioether copolymers.

The present inventors have carried out an extensive investigation with a view toward overcoming the above-described problems involved in the prior art. As a result, it has been found that when an alkali metal sulfide is caused to act on PATE, the principal chain of PATE is cut to depolymerize PATE, whereby a compound (prepolymer) having an alkali thiolate group on one terminal or each terminal thereof can be obtained with ease.

It has also been found that when this prepolymer having at least one terminal alkali thiolate group is reacted with each of various dihalogen-substituted compounds in a water-containing polar organic solvent, it undergoes polymerization reaction again, thereby obtaining their corresponding copolymers having a high degree of polymerization. In addition, it has also been revealed that this prepolymer exhibits excellent stability in the polymerization reaction system. Namely, only the merit of the above-described production process for PATE, in which the aromatic dithiol or alkali thiolate having good reactivity is used as a raw material, can be utilized.

According to this process, a prepolymer having at least one terminal alkali thiolate group can be prepared by using as a raw material a dihalogen-substituted aromatic compound of Group (G1). The prepolymer thus prepared smoothly reacts with a dihalogen-substituted aromatic compound in Group (G2) under relatively mild conditions and can provide a copolymer high in polymerization degree, uniform in composition and excellent in melt stability. Besides, the prepolymer also reacts to a dihalogen-substituted aromatic compound in Group (G3) under relatively mild conditions and can provide a copolymer high in polymerization degree, uniform in composition and excellent in melt stability with little precipitation of polymer formed in the initial stage of the polymerization reaction.

According to this process, it is also possible to decrease the amount of salts formed in the reaction system. Therefore, the amount of ionic impurities in the resulting copolymer can be lowered.

Further, according to this process, PATEs ranging from oligomers low in polymerization degree to polymers high in polymerization degree can also be depolymerized into prepolymers, so that any oligomers off-specification products, scraps from molding or forming, molded or formed products after use, etc. can be used as raw materials. The present invention has been brought to completion on the basis of these findings.

According to the present invention, there is thus provided a process for the production of an arylene thioether copolymer (C), which comprises causing an alkali metal sulfide to act on a poly(arylene thioether) (A) having predominant recurring units of the formula [I]:

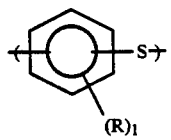

[I]

R denotes an alkyl group having 1–6 carbon atoms, and l stands for 0 or an integer of 1–4, in a water-containing polar organic solvent so as to depolymerize the poly(arylene thioether) (A), thereby preparing a prepolymer (B) having an alkali thiolate group on at least one terminal thereof and then subjecting the resultant prepolymer (B) and optionally, an alkali metal sulfide to a polymerization reaction with at least one compound selected from dihalogen-substituted aromatic compounds represented by the following general formulae [II] through [V]:

[II]

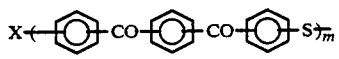

[III]

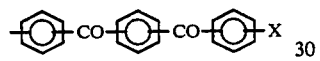

[IV]

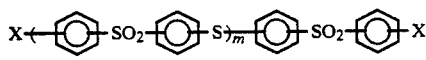

[V]

wherein m stands for 0 or an integer of 1–100, and X means a halogen atom in a water-containing polar organic solvent.

According to this invention, there is also provided a process for the preparation of a prepolymer (B) having an alkali thiolate group on at least one terminal, which is useful as a raw material for an arylene thioether copolymer (C).

DETAILED DESCRIPTION OF THE INVENTION

Features of the present invention will hereinafter be described in detail.

Raw PATE (A)

In this invention, the PATE (A) which is a raw material used in depolymerization is a poly(arylene thioether) (A) having predominant recurring units of the formula [I]:

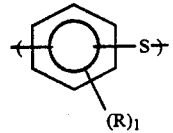

[I]

wherein R denotes an alkyl group having 1–6 carbon atoms, and l stands for 0 or an integer of 1–4. The term "having predominant recurring units" as used herein means that the recurring units are contained in an amount of at least 50 mol % in the polymer.

PATEs (A) useful as a raw material in this invention may include those ranging from polymers of high polymerization degrees, whose melt viscosities are of the order of $10^6$ poises (as measured at 310° C. and a shear rate of 1200 sec$^{-1}$) to oligomers of low polymerization degrees, which contain about several recurring units, preferably about several tens recurring units. In addition, off-specification products and moreover scraps from molding or forming, waste plastics, etc. can also be used.

No particular limitation is imposed on such a raw PATE (A). However, it is generally obtained by a reaction of a dihalogen-substituted aromatic compound and an alkali metal sulfide. As disclosed in, for example, U.S. Pat. Nos. 3,919,177 and 4,645,826 described above, it can be obtained by polymerizing under heating the alkali metal sulfide and dihalogen-substituted aromatic compound in a polar organic solvent such as N-methylpyrrolidone.

In the present invention, there may suitably be used further a PATE obtained by subjecting an alkali metal sulfide and a dihalogen-substituted aromatic compound, which consists principally of a compound represented by the following general formula [X]:

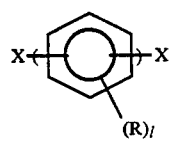

[X]

wherein X means a halogen atom, R denotes an alkyl group having 1–6 carbon atoms, and l stands for 0 or an integer of 1–4, in a proportion of 0.9–1.1 moles, preferably 0.95–1.05 moles, more preferably 0.97–1.03 moles per mole of the alkali metal sulfide to a polymerization reaction in a water-containing polar organic solvent.

As illustrative examples of the compound represented by the general formula [X], may be mentioned dihalogen-substituted aromatic compounds such as p-dichlorobenzene, m-dichlorobenzene, 2,6-dichlorotoluene, 2,5-dichlorotoluene and p-dibromobenzene. Other dihalogen-substituted aromatic compounds such as 2,6-dichloronaphthalene, 1-methoxy-2,5-dichlorobenzene, 4,4'-dichlorobiphenyl, 3,5-dichlorobenzoic acid, 4,4'-dichlorodiphenyl ether, 4,4'-dichlorodiphenyl sulfone and 4,4'-dichlorodiphenyl sulfoxide, 4,4'-dichlorodiphenyl ketone may be used as minor components in an amount less than 50 mol %.

Although the PATE thus obtained may be used in the form isolated from the reaction mixture, the reaction mixture may be provided for depolymerization as it is. When the reduction of ionic impurities is desired in particular, it is preferably to use that obtained by isolating the polymer from the polymerization reaction mixture and purifying it by washing or the like.

Incidentally, the polar organic solvent and water, which are contained in the reaction mixture, are utilized as a portion of the components in the depolymerizing step as it is. Moreover, a PATE obtained by cooling the reaction mixture to precipitate the PATE therefrom may also be used.

Alkali Metal Sulfide

As illustrative examples of the alkali metal sulfide used in the depolymerization of the PATE (A), may be mentioned lithium sulfide, sodium sulfide, potassium sulfide, rubidium sulfide, cesium sulfide and mixtures thereof.

In addition, an alkali metal sulfide prepared in situ from an alkali hydrosulfide and an alkali hydroxide in a reaction system may also be used.

Dihalogen-Substituted Aromatic Compound

The dihalogen-substituted aromatic compound to be reacted with the prepolymer (B) obtained by the depolymerization of PATE (A) and having an alkali thiolate group on at least one terminal is at least one compound selected from those represented by the general formulae [II] through [V]:

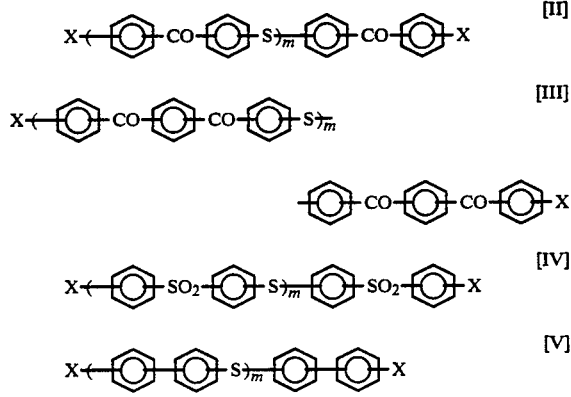

wherein m stands for 0 or an integer of 1-100, and X means a halogen atom.

The halogen atoms X are selected from fluorine, chlorine, bromine and iodine and may be identical to or different from each other. It is particularly preferred that they are selected from chlorine and bromine.

As dihalogen-substituted aromatic compounds where m is 0, may be mentioned compounds represented by the following general formulae [VI] through [IX]:

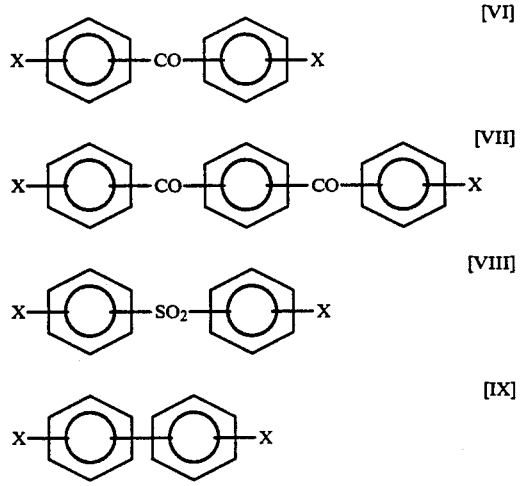

wherein X means a halogen atom.

Besides, oligomers or polymers, which are formed by a reaction of a compound represented by the general formula [VI], [VII], [VIII] or [IX] with an alkali metal sulfide in a small amount and have a halogen atom on each terminal thereof, may also be used (where m is 1-100). In this case, m is preferably an integer of 1-20, more preferably 1-8. If m exceeds 100, there is a potential problem that such compounds have insufficient reactivity.

As illustrative examples of the compound represented by the general formula [VI], may be mentioned 4,4'-dichlorobenzophenone, 4,4'-dibromobenzophenone, etc.

As illustrative examples of the compound represented by the general formula [VII], may be mentioned 1,3-bis(4-chlorobenzoyl)benzene, 1,3-bis(4-bromobenzoyl)benzene, 1,4-bis(4-chlorobenzoyl)benzene, 1,4-bis(4-bromobenzoyl)benzene, etc.

As illustrative examples of the compound represented by the general formula [VIII], may be mentioned 4,4'-dichlorodiphenyl sulfone, 4,4'-dibromodiphenyl sulfone, etc.

As illustrative examples of the compound represented by the general formula [IX], may be mentioned 4,4'-dibromobiphenyl, 4,4'-dichlorobiphenyl, etc.

Polar Organic Solvent

As the polar organic solvent, aprotic organic amide solvents typified by N-alkylpyrrolidones such as N-methylpyrrolidone, 1,3-dialkyl-2-imidazolidinones, tetraalkylureas, hexaalkylphosphoric triamides and the like are preferred because they have good stability in the reaction system and permit the provision of high-molecular weight polymers.

Production Process

The process for the production of the arylene thioether copolymer (C) according to this invention comprises the first step (depolymerization step or alkali thiolate-formation step) in which an alkali metal sulfide is caused to act on a PATE (A) so as to depolymerize the PATE (A), thereby obtaining a prepolymer (B) having an alkali thiolate group on at least one terminal thereof and the second step (polymerization step or repolymerization step) in which the resultant prepolymer (B) is reacted with at least one compound selected from various dihalogen-substituted aromatic compounds, thereby repolymerizing the prepolymer (B).

Depolymerization Step

In general, the prepolymer (B) having an alkali thiolate group on at least one terminal thereof can suitably be obtained by subjecting a mixture comprising:

(a) a polar organic solvent containing water in a proportion of 0.1-20 moles per kg of the polar organic solvent;

(b) a PATE (A) in a proportion of 0.1-5 basal moles per kg of the polar organic solvent; and (c) an alkali metal sulfide in a proportion of 0.01-1 mole per basal mole of the PATE (A) to a depolymerization reaction at 200°-300° C. for 0.1-30 hours.

The reaction is generally conducted at 200°-300° C., preferably 220°-280° C., more preferably 235°-280° C. Any reaction temperatures lower than 200° C. result in insufficient depolymerization and formation of alkali thiolate group, and require too long reaction time. On the other hand, if the temperature is higher than 300° C., decomposition reaction tends to occur. Reaction temperatures outside the above range are therefore not preferred.

The reaction is generally conducted for 0.1-30 hours, more preferably 0.5-20 hours. Any reaction time shorter than 0.1 hour involves a potential problem of insufficient reaction. To the contrary, any time longer than 30 hours results in an economical disadvantage.

The water content in the depolymerization step is desirably within a range of 0.1-20 moles, preferably 0.2-10 moles per kg of the polar organic solvent. Any water contents less than 0.1 mole or higher than 20 moles involve a potential problem that an undesirable side reaction occurs.

The amount of the PATE (A) used in the depolymerization is desirably within a range of 0.1-5 basal moles, preferably 0.2-4 basal moles per kg of the polar organic solvent. Any amounts less than 0.1 basal mole result in reduction in productivity. To the contrary, any amounts more than 5 basal moles result in the formation of a reaction system high in viscosity. Amounts outside the above range are hence not preferred.

The term "basal mole" as used herein means the number of moles, which has been calculated supposing the sum of atomic weights of elements constituting a recurring unit [I] of the PATE is 1 gram molecule.

The amount of the alkali metal sulfide is desirably within a range of 0.01-1 mole, preferably 0.02-0.9 mole, more preferably 0.05-0.8 mole per basal mole of the PATE (A). Any amounts less than 0.01 mole involve a potential problems that the formation of alkali thiolate group becomes insufficient. To the contrary, any amounts exceeding 1 mole is accompanied by a potential problem that the uniformity in composition, and melt stability of the copolymer (C) obtained in the polymerization step are adversely affected.

The mixture containing the water-containing polar organic solvent, poly(arylene thioether) (A) and alkali metal sulfide is desirably alkaline such that the pH of an aqueous solution obtained by diluting the mixture with water in an amount 100 times the weight of the mixture is 9 or higher, preferably 10 or higher. Any pH lower than 9 involves a potential problem that the depolymerization and formation of alkali thiolate group become insufficient.

In order to alkalify the mixture to a desired extent, a basic compound may be added in a proportion of 0.001-1 mole, preferably 0.01-0.5 mole per basal mole of the PATE (A).

As such a basic compound, may be mentioned at least one compound selected from the hydroxides, oxides and carbonates of alkali metals or alkaline earth metals.

In the above-described manner, the prepolymer (B) having an alkali thiolate group on at least one terminal thereof can be obtained. It is believed that such a prepolymer (B) generally consists principally of that having an alkali thiolate group on each terminal thereof.

The polymerization degree of the prepolymer (B) varies according to reaction conditions such as the polymerization degree of the raw PATE (A) and the amount of the alkali metal sulfide used in the depolymerization and hence, the prepolymer (B) ranges from oligomers having one through several recurring units [I] to those having a relatively high polymerization degree. In this invention, no particular limitation is imposed on use of the prepolymer (B), so that oligomers and high-molecular weight polymers can be used irrespective of polymerization degree, and they may also be used in the form of a mixture thereof.

The prepolymer (B) having an alkali thiolate group on at least one terminal thereof may be used stably as a component in the subsequent polymerization step as it is in the form of a reaction mixture containing same. It is also possible to separate once the prepolymer (B) from the reaction mixture under non-oxidizing conditions, as necessary, and then to use it as a component in the subsequent polymerization step.

The reaction system after the prepolymer (B) having at least one terminal alkali thiolate group has been formed by the depolymerization with the alkali metal sulfide does not require to be strongly alkaline. In some cases, there is a potential problem that the polymerization reaction is rather perturbed by the strong alkaline conditions.

Therefore, after the reaction for the formation of alkali thiolate group, the reaction mixture may be partially neutralized with an acid substance when the prepolymer (B) formed is used in the subsequent polymerization step as it is without separating it from the reaction mixture. However, it is not preferred to acidify the reaction mixture because the alkali thiolate group becomes liable to decompose.

As a neutralizing agent, a proton acid and/or a salt of a strong acid and a weak base, or the like may be used. A salt of a strong acid and a weak base is particularly preferred. As specific examples of the neutralizing agent, may be mentioned ammonium halides, dilute mineral acids, organic carboxylic acids, etc.

Polymerization Step

In general, the polymerization reaction of the prepolymer (B) having an alkali thiolate group on at least one terminal thereof and at least one compound selected from the dihalogen-substituted aromatic compounds represented by the general formulae [II] through [V] can suitably be conducted by subjecting a mixture comprising:

(a) the polar organic solvent containing water in a proportion of 0.5-30 moles per kg of the polar organic solvent;

(b) the prepolymer (B) having at least one terminal alkali thiolate group in a proportion of 0.05-5 basal moles per kg of the polar organic solvent; and (c) at least one compound selected from the dihalogen-substituted aromatic compounds represented by the general formulae [II] through [V] in a proportion of 0.7-1.3 moles per mole of the prepolymer (B) to a polymerization reaction at 80°-300° C. for 0.1-30 hours.

The temperature of the polymerization reaction is generally 80°-300° C., more preferably 100°-280° C. Any reaction temperatures lower than 80° C. involve a potential problem that the polymerization reaction becomes insufficient. To the contrary, any temperatures exceeding 300° C. is accompanied by a potential problem that decomposition reaction occurs.

The polymerization time is generally 0.1-30 hours, more preferably 0.5-20 hours. Any polymerization time shorter than 0.1 hour involves a potential problem that the polymerization reaction becomes insufficient. On the other hand, any time exceeding 30 hours results in poor productivity.

When the polymerization reaction is conducted by heating up the mixture in two or more multi-stages, a copolymer of higher molecular weight is easy to obtain for a shorter period of time. For example, there is a process in which preliminary polymerization is conducted at a temperature up to 235° C. and then, final polymerization is carried out at a temperature raised to at least 245° C.

The amount of water contained in the reaction system in this polymerization step is desirably within a range of 0.5-30 moles, preferably 1-25 moles, more preferably 5-20 moles per kg of the polar organic solvent. A part of water may be added in the course of the polymerization reaction. In particular, when the polymerization reaction is continued while heating the reaction mixture up to at least 245° C. in the latter half of the polymerization step, an arylene thioether copolymer (C) having a higher molecular weight and far excellent melt stability is easy to obtain when water is supplemented right before or after the temperature is raised.

If the amount of water is less than 0.5 mole or more than 30 moles, undesirable side reaction or the like is liable to occur and moreover, a high-molecular weight copolymer is hard to obtain.

The amount of the prepolymer (B) is desirably within a range of 0.05-5 basal moles, preferably 0.1-4 basal moles per kg of the polar organic solvent. Any amounts less than 0.05 basal mole are disadvantageous in productivity, while any amounts more than 5 basal moles result in the formation of a reaction system high in viscosity. Amounts outside the above range are hence not preferred. The term "basal mole" of the prepolymer (B) means the number of moles, which has been calculated supposing the sum of atomic weights of elements constituting the recurring unit [I] is 1 gram molecule.

The amount of the dihalogen-substituted aromatic compound is desirably within a range of 0.7-1.3 moles, more preferably 0.9-1.1 mole per mole of the prepolymer (B). If the amount is less than 0.7 mole or more than 1.3 moles, a high-molecular weight copolymer is hard to obtain.

The number of moles of the prepolymer (B) in this invention is defined as the number of moles of the alkali metal sulfide, which has been determined by subtracting the amount of the remaining alkali metal sulfide after the depolymerization reaction from the amount of the alkali metal sulfide added upon the preparation of the prepolymer (B).

In the present invention, an alkali metal sulfide may be used in the step wherein the prepolymer (B) and the dihalogen-substituted aromatic compound are subjected to the polymerization reaction, if necessary. In this case, the alkali metal sulfide may be used in an amount of 60 mol % or less, preferably 50 mol % or less, more preferably 30 mol % or less based on the total amount of the prepolymer (B) and the alkali metal sulfide added previously. The amount of the alkali metal sulfide to be used in this case is added to the number of moles of the prepolymer (B), which has been defined above upon the recitation as to the amount of the dihalogen-substituted aromatic compound, and this total amount is hence regarded as the number of moles of the prepolymer (B) to be polymerized.

ADVANTAGES OF THE INVENTION

The present invention can provide arylene thioether copolymers high in degree of polymerization, excellent in uniformity of composition and melt stability and low in content of ionic impurities by using as starting materials at least two dihalogen-substituted aromatic compounds, which are different from each other in stability and reactivity in the reaction system, in solubility in a polymerization solvent, or the like.

The present invention also permits the recycling and reuse of any oligomers produced secondarily in the course of the production of PATE, off-specification products, scraps from molding or forming of PATE and waste plastics after use and hence, can contribute to the effective utilization of resources.

The arylene thioether copolymers (C) obtained in accordance with the production process of this invention can be used as resins excellent in heat resistance, flame retardance, chemical resistance, mechanical strength, processability and the like in a wide variety of application fields, for example, as injection-molded products, extruded products, films (oriented or unoriented), sheets, sealing materials, etc.

EMBODIMENTS OF THE INVENTION

The present invention will hereinafter be described specifically by the following referential examples, examples and comparative examples. It should however be borne in mind that the present invention is not limited to the following examples only.

Incidentally, the following methods were followed for the measurement of the physical properties of polymers in the following examples.

Measurement of Physical Properties

Melting point (Tm), glass transition temperature (Tg)

The melting point (Tm) and glass transition temperature (Tg) of each polymer sample were measured in the following manner. The polymer sample is formed into a sheet of 0.5 mm thick by hot-pressing it at about 350° C. and then quenching the polymer thus hot-pressed. The thus-obtained sheet was heated by a differential scanning calorimeter (DSC) at a rate of 10° C./min from room temperature in a nitrogen gas atmosphere so as to measure its melting point (Tm) and glass transition temperature (Tg). Incidentally, the melting point, Tm of the polymer sample in the form of particles was also measured under the same conditions as described above without forming any sheet by the hot pressing.

Melt Stability

The melt stability of each polymer sample was evaluated in terms of percent reduction in crystallization enthalpy, which was determined in accordance with the following equation:

Percent reduction = $[(\Delta Hmc\ (0\ min) - \Delta Hmc\ (10\ min))/\Delta Hmc\ (0\ min)] \times 100$ wherein $\Delta Hmc$ (0 min) means a crystallization enthalpy as measured when the polymer sample in the form of particles was cooled at a rate of 10° C./min immediately after being rapidly heated to 400° C. in a nitrogen gas atmosphere by means of a DSC, and $\Delta Hmc$ (10 min) denotes a crystallization enthalpy as measured when cooled at a rate of 10° C./min after being rapidly heated to 400° and then held for 10 minutes at 400° C. The percent reduction becomes smaller as the melt stability of the polymer at 400° C. is higher. To the contrary, the lower the melt stability, the greater the percent reduction. Polymers low in melt stability undergo crosslinking or the like in a melt state (400° C.), so that their crystallinity is reduced or lost.

Melt Viscosity ($\eta^*$)

The melt viscosity ($\eta^*$) of each polymer sample was measured at a shear rate of 1,200 sec$^{-1}$ and varied temperatures.

Compositional Ratio of Polymer

Calculated from the data of elemental analysis as to sulfur in each polymer sample.

Amount of Sodium Ions

The amount of sodium ions was determined by subjecting a sample solution, which as been prepared by decomposing each polymer sample in heated concentrated sulfuric acid and then treating it with aqueous hydrogen peroxide, to ion chromatography.

Determination of Number-Average Molecular Weight

A portion of the reaction mixture (containing an alkali thiolate-containing product) was sampled out and then added with significantly excess amount of methyl iodide. The resultant mixture was stirred for 24 hours, whereby the terminal alkali thiolate groups were converted into methyl thioether groups to stabilize the terminals. The reaction mixture sample containing the prepolymer thus stabilized was poured into a great amount of water. After being neutralized, the resulting prepolymer was thoroughly washed with water and dried under reduced pressure to prepare a prepolymer sample. Each of raw PATE polymers was used as a sample polymer as it is.

Each number-average molecular weight was determined by gel permeation chromatography (GPC).
Measuring conditions are as follows:
Column: SHODEX AT80M/S, two columns in series
Solvent: α-chloronaphthalene
Flow rate: 0.7 ml/min
Temperature: 220° C.
Sample concentration: 0.05 wt. %
Charged amount: 200 μl
Detector: flame ionization detector (FID)
Calibration of molecular weight: standard poly(styrene) and

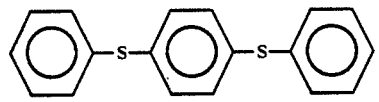

Data processing: SIC 7000B (manufactured by System Instrument Co.)

REFERENTIAL EXAMPLE

Preparation of Raw PATE (A)

A titanium-lined autoclave was charged with 7.0 kg of N-methylpyrrolidone (NMP) and 3.03 kg (18.02 moles) of hydrated sodium sulfide (water content: 53.6 wt. %). After the autoclave being purged with nitrogen gas, 2.02 kg of an NMP solution, which contained 1.32 kg of water, and 0.41 mole of hydrogen sulfide were distilled out while gradually heating the contents to 200° C.

Thereafter, a liquid mixture consisting of 2.65 kg (18.03 moles) of p-dichlorobenzene, 0.24 kg (13.32 moles) of water and 3.70 kg of NMP was fed to react the contents at 220° C. for 5 hours. Then, 0.72 kg (40.00 moles) of water was additionally introduced under pressure in the autoclave. The contents were heated to 255° C. to react them for 3 hours.

The resultant reaction mixture was sifted by a screen to separate the resulting particulate polymer. The polymer was washed three times with acetone and further three times with water, and then dewatered and dried at 100° C., thereby obtaining a PATE (A-1) as white granules.

Physical properties of PATE (A-1) were as follows:
Percent reduction in ΔHmc: 17%
Tm: 281° C.
Tg: 86° C.
$\eta^*$: 2200 poises (at 310° C.)
Number-average molecular weight: about 11,000
Sodium ions: 450 ppm.

EXAMPLE 1

Depolymerization and Alkali Thiolate-Forming Reaction

In a titanium-lined autoclave, a mixture consisting of 150.0 g (1.39 basal moles) of PATE (A-1) prepared in Referential Example 1, 1.5 kg of NMP, 53.3 g (0.317 mole) of hydrated sodium sulfide (water content: 53.6 wt. %), 2.0 g (0.027 mole) of calcium hydroxide and 26.0 g (1.44 moles) of water was stirred to prepare a liquid mixture.

The pH of an aqueous solution obtained by diluting a small amount of the liquid mixture sample with water in an amount 100 times the weight of the sample was 11.6.

The liquid mixture was heated at 240° C. for 2 hours while stirring it in a nitrogen gas atmosphere, thereby conducting depolymerization and alkali thiolate-forming reaction to obtain a reaction mixture (A). The amount of S$^{2-}$ in the reaction mixture (A) was determined by ion chromatography. As a result, it was found that most of sodium sulfide reacted and its remaining amount was 4% of the charged amount.

No particles of the raw PATE were recognized in the reaction mixture (A) at 100° C., and the reaction mixture was in the form of a substantially uniform solution.

Analysis of Alkali Thiolate-Containing Product

A reaction mixture (A) prepared in the same manner as described above was diluted with water in an amount 10 times the reaction mixture. After the resulting dilute mixture was adjusted to pH 3 with hydrochloric acid, the resultant polymer was thoroughly washed with water and then dried at room temperature under reduced pressure, thereby obtaining a thiol-containing product.

The thiol-containing product gave off an odor of thiophenol. By an infrared spectrum analysis, an absorption peak attributed to thiol group, which was not observed on PATE (A-1) as the raw material, was observed at about 2560 cm$^{-1}$. The content of sulfur in the thiol-containing product increased to 33.8 wt. % as against 29.60 wt. % the theoretical value of the PATE.

The melt viscosity of the thiol-containing product was lower than 50 poises (at 310° C.), and accurate determination beyond that was infeasible. The number-average molecular weight of a methylated product with the alkali thiolate groups converted into methyl thioether groups was about 550.

Copolymerization Reaction

After reacting the reaction mixture (A) [containing 0.304 mole of a prepolymer (B) and 0.013 mole of sodium sulfide], which had been obtained in the above-described manner, with 114.7 g (0.323 mole) of 1,4-bis(4-chlorobenzoyl)benzene at 160° C. for 1 hour in a titanium-lined autoclave, 135 g (7.49 moles) of water was introduced under pressure to react the contents further at 270° C. for 1 hour.

The thus-obtained reaction mixture was sifted by a screen to separate a granular polymer. The polymer thus separated was washed three times with acetone and further three times with water, and then dewatered and dried at 100° C., thereby obtaining a polymer (Polymer $P_1$) as pale yellow granules with a yield of 85%.

Physical Properties of Polymer

Physical properties of Polymer $P_1$ thus obtained were as followed:
Percent reduction in $\Delta$Hmc: 8%
Tm: 316° C. (the granular copolymer after drying had a Tm of 327° C. and showed a single peak)
Tg: 108° C.
$\eta$*: 110 poises (at 370° C.)
Sodium ions: 55 ppm.
Average composition:

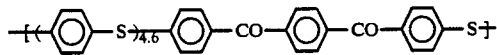

EXAMPLE 2

Depolymerization and alkali thiolate-forming reaction were conducted in a similar manner to Example 1 except that the amounts of hydrated sodium sulfide (water content: 53.6 wt. %) and water were changed from 53.3 g to 20.0 g (0.119 mole) and from 26 g to 42 g (2.33 moles), respectively. The amount of sodium sulfide remaining in the reaction mixture was substantially 0, and the number-average molecular weight of a methylated product with the alkali thiolate groups converted into methyl thioether groups was about 1,300.

Then, using the reaction mixture [containing 0.119 mole of a prepolymer (B)], copolymerization reaction was carried out in a similar manner to Example 1 except that the amount of 1,4-bis(4-chlorobenzoyl)benzene was changed from 114.7 g to 43.0 g (0.121 mole).

The thus-obtained reaction mixture was treated in the same manner as in Example 1 to obtain a polymer (Polymer $P_2$) as ivory granules with a yield of 88%.

Physical Properties of Polymer

Physical properties of Polymer $P_2$ thus obtained were as followed:
Percent reduction in $\Delta$Hmc: 5%
Tm: 292° C. (the granular copolymer after drying had a Tm of 304° C. and showed a single peak)
Tg: 102° C.
$\eta$*: 150 poises (at 370° C.)
Sodium ions: 25 ppm.
Average composition:

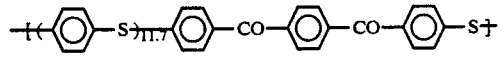

EXAMPLE 3

In a titanium-lined autoclave, a mixture consisting of 50.0 g (0.462 basal mole) of PATE (A-1) prepared in Referential Example 1, 500 g of NMP, 17.6 g (0.105 mole) of hydrated sodium sulfide (water content: 53.6 wt. %), 1.0 g (0.013 mole) of calcium hydroxide and 9.0 g (0.50 mole) of water was stirred to prepare a liquid mixture.

The liquid mixture was heated to 240° C. while stirring it in a nitrogen gas atmosphere to conduct depolymerization and alkali thiolate-forming reaction for 1.5 hours. The amount of sodium sulfide remaining in the resultant reaction mixture was 4.5%, and the number-average molecular weight of a methylated product with the alkali thiolate groups converted into methyl thioether groups was about 550.

To the reaction mixture [containing 0.10 mole of a prepolymer (B) and 0.005 mole of sodium sulfide], was added 31.0 g (0.108 mole) of 4,4'-dichlorodiphenyl sulfone. After reacting the contents at 100°–150° C. for 3 hours, 50 g (2.77 moles) of water was introduced under pressure to react the contents at 250° C. for 2 hours.

The thus-obtained reaction mixture was treated in the same manner as in Example 1 to obtain a polymer (Polymer $P_3$) as white granules with a yield of 86%.

Physical Properties of Polymer

Physical properties of Polymer $P_3$ thus obtained were as followed. However, since Polymer $P_3$ was amorphous, its percent reduction in $\Delta$Hmc and Tm were immeasurable.
Tg: 121° C.
$\eta$*: 160 poises (at 310° C.)
Sodium ions: 50 ppm.
Average composition:

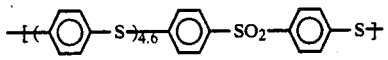

(determined by oxygen analysis)

EXAMPLE 4

In a titanium-lined autoclave, a mixture consisting of 150.0 g (1.39 basal moles) of PATE (A-1) prepared in Referential Example 1, 1.5 kg of NMP, 53.3 g (0.317 mole) of hydrated sodium sulfide (water content: 53.6 wt. %), 2.0 g (0.027 mole) of calcium hydroxide and 26.0 g (1.44 moles) of water was stirred to prepare a liquid mixture.

The liquid mixture wa heated to 240° C. while stirring it in a nitrogen gas atmosphere to conduct depolymerization and alkali thiolate-forming reaction for 1.5 hours. The amount of sodium sulfide remaining in the resultant reaction mixture was 4.5%, and the number-average molecular weight of a methylated product with the alkali thiolate groups converted into methyl thioether groups was about 600.

To the reaction mixture [containing 0.303 mole of a prepolymer (B) and 0.014 mole of sodium sulfide], was added 100.0 g (0.320 mole) of 4,4'-dibromobiphenyl. After reacting the contents at 160°–200° C. for 2 hours, 135 g (7.49 moles) of water was introduced under pressure to react the contents at 270° C. for 0.5 hour.

The thus-obtained reaction mixture was treated in the same manner as in Example 1 to obtain a polymer (Polymer $P_4$) as white granules with a yield of 87%.

Physical Properties of Polymer

Physical properties of Polymer $P_4$ thus followed. With respect to Polymer $P_4$, Tm was observed at 240° C. as a single peak in the state of a granular polymer, but no Tm was observed in the state of a pressed sheet. Therefore, this polymer was amorphous. For this reason, its percent reduction in ΔHmc and Tm were immeasurable.

Tg: 99° C.
η*: 60 poises (at 310° C.)
Sodium ions: 65 ppm.
Average composition:

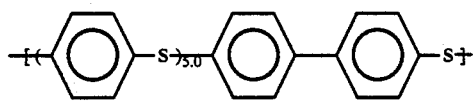

EXAMPLE 5

Depolymerization and Alkali Thiolate-Forming Reaction

In a titanium-lined autoclave, a mixture consisting of 150.0 g (1.39 basal moles) of PATE (A-1) prepared in Referential Example 1, 1.5 kg of NMP, 53.3 g (0.317 mole) of hydrated sodium sulfide (water content: 53.6 wt. %), 2.0 g (0.027 mole) of calcium hydroxide and 26.0 g (1.44 moles) of water was stirred to prepare a liquid mixture.

The liquid mixture was heated at 240° C. for 3 hours while stirring it in a nitrogen gas atmosphere to conduct depolymerization and alkali thiolate-forming reaction. The amount of sodium sulfide remaining in the resultant reaction mixture was 3%, and the number-average molecular weight of a methylated product with the alkali thiolate groups converted into methyl thioether groups was about 500.

Preparation of Low-Molecular Weight Poly(ketone Thioether)

A titanium-lined autoclave was charged with 500 g of NMP, 48.0 g (0.286 mole) of hydrated sodium sulfide (water content 53.6 wt. %), 120.0 g (0.478 mole) of 4,4'-dichlorobenzophenone and 9.0 g (0.50 mole) of water. After the autoclave being purged with nitrogen gas, the contents were reacted at 220.C for 2 hours under stirring. The amount of sodium sulfide remaining in the reaction mixture was 0%.

Copolymerization Reaction

A titanium-lined autoclave was charged with 1041.3 g (corresponding to 0.834 basal mole of the PATE) of the reaction mixture [containing 0.185 mole of a prepolymer (B) and 0.006 mole of sodium sulfide], which had been obtained by conducting the alkali thiolate-forming reaction, and the whole amount of the low-molecular weight poly(ketone thioether)-containing reaction mixture. After the autoclave being purged with nitrogen gas, the contents were reacted at 180°–200° C. for 2 hours under stirring. Thereafter, 135 g (7.49 moles) of water was introduced under pressure to react the contents further at 270° C. for 0.5 hour.

The thus-obtained reaction mixture was treated in the same manner as in Example 1, thereby obtaining a polymer (Polymer P5) as ivory granules with a yield of 87%.

Physical Properties of Polymer

Physical properties of Polymer P5 thus obtained were as followed:

Percent reduction in ΔHmc: 10%

Tm: 302° C. (the granular copolymer after drying had a Tm of 311° C. and showed a single peak)
Tg: 111° C.
η*: 120 poises (at 370° C.)
Sodium ions: 150 ppm.
Average composition:

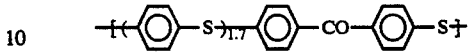

Besides, the polymerization degree of the low-molecular weight poly(ketone thioether) prepared in this example was determined by GPC.

Column: SHODEX AT80M/S (two columns)
Solvent: p-chlorophenol/1,2,4-trichlorobenzene
Temperature: 150° C.
Detector: FID The number-average molecular weight determined in terms of polystyrene was about 1300. This polymer corresponds to the dihalogen-substituted aromatic compound represented by the general formula [II] wherein m is 5.

EXAMPLE 6

Preparation of Slurry of Raw PATE (A)

A titanium-lined autoclave was charged with 4000 g of NMP and 1680 g (9.99 moles) of hydrated sodium sulfide (water content: 53.6 wt. %). After the autoclave being purged with nitrogen gas, 1700 g of an NMP solution, which contained 600 g of water, and 0.23 mole of hydrogen sulfide were distilled out while gradually heating the contents to 203° C.

Thereafter, a liquid mixture consisting of 1442 g (9.81 moles) of p-dichlorobenzene and 2100 g of NMP was fed to react the contents at 220° C. for 10 hours, thereby obtaining a slurry of PATE (A-2). The conversion of p-dichlorobenzene was 97%. The number-average molecular weight of PATE (A-2) was about 4500.

Depolymerization and Alkali Thiolate-Forming Reaction

A portion (1042 g, containing 1.32 basal moles of PATE) of a uniform slurry obtained by thoroughly stirring the resultant PATE (A-2) slurry was dispersed in a titanium-lined autoclave. Then, 810 g of NMP, 53.3 g (0.317 mole) of hydrated sodium sulfide (water content: 53.6 wt. %) and 2.0 g (0.027 mole) of calcium hydroxide were added under stirring to prepare a liquid mixture. The pH of an aqueous solution obtained by diluting a small amount of the liquid mixture sample with water in an amount 100 times the weight of the sample was 11.6. While stirring in a nitrogen gas atmosphere, the liquid mixture was then heated to 250° C. to react the contents for 2 hours, thereby conducting depolymerization and alkali thiolate-forming reaction. No particles of PATE (A-2 were recognized at 100° C. in the liquid mixture after the reaction, and the liquid mixture was in the form of a substantially uniform solution. Incidentally, the amount of sodium sulfide remaining in the resultant reaction mixture was 5%, and the number-average molecular weight of a methylated product with the alkali thiolate groups converted into methyl thioether groups was about 500.

Polymerization Reaction

To the reaction mixture [containing 0.301 mole of a prepolymer (B) and 0.016 mole of sodium sulfide], which had been obtained in the above-described manner, was added 114 g (0.32I mole) of 1,4-bis(4-chlorobenzoyl)benzene. After reacting the contents at 160° C. for 2 hours, 150 g (8.32 moles) of water was additionally introduced under pressure to react the contents at 270° C. for 0.5 hour.

The thus-obtained reaction mixture was treated in the same manner as in Example 1, thereby obtaining a polymer (Polymer $P_6$) as pale yellow granules with a yield of 85%.

Physical Properties of Polymer

Physical properties of Polymer $P_6$ thus obtained were as followed:
Percent reduction in $\Delta Hmc$: 12%
Tm: 316° C. (the granular copolymer after drying had a Tm of 329° C. and showed a single peak)
Tg: 106° C.
$\eta^*$: 70 poises (at 370° C.)
Sodium ions: 330 ppm.
Average composition:

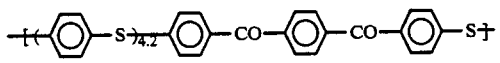

EXAMPLE 7

In a titanium-lined autoclave, a mixture consisting of 150.0 g (1.39 basal moles) of PATE (A-1) prepared in Referential Example 1, 1.5 kg of NMP, 51.0 g (0.303 mole) of hydrated sodium sulfide (water content: 53.6 wt. %), 2.0 g (0.027 mole) of calcium hydroxide and 30 g (1.66 moles) of water was stirred to prepare a liquid mixture.

The liquid mixture was heated to 240° C. while stirring it in a nitrogen gas atmosphere, thereby conducting depolymerization and alkali thiolate-forming reaction for 3.5 hours. The amount of sodium sulfide remaining in the resultant reaction mixture was 3%, and the number-average molecular weight of a methylated product with the alkali thiolate groups converted into methyl thioether groups was about 600.

To the reaction mixture [containing 0.294 mole of a prepolymer (B) and 0.009 mole of sodium sulfide], was added 77.0 g (0.307 mole) of 4,4'-dichlorobenzophenone. After reacting the contents at 160° C. for 1 hour, 135 g (7.49 moles) of water was introduced under pressure to react the contents further at 270° C. for 1 hour.

The thus-obtained reaction mixture was treated in the same manner as in Example 1, thereby obtaining a polymer (Polymer $P_7$) as ivory granules with a yield of 87%.

Physical Properties of Polymer

Physical properties of Polymer $P_7$ thus obtained were as followed:
Percent reduction in $\Delta Hmc$: 7%
Tm: 286° C. (the granular copolymer after drying had a Tm of 297° C. and showed a single peak)
Tg: 102° C.
$\eta^*$: 100 poises (at 370° C.)
Sodium ions: 50 ppm.
Average composition:

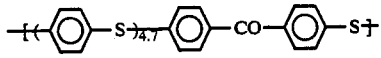

COMPARATIVE EXAMPLE 1

As a comparative example, the following polymerization experiment was performed in place of Example 1 wherein a prepolymer having at least one terminal alkali thiolate group was prepared by depolymerization to react it with 1,4-bis(4-chlorobenzoyl)benzene.

A titanium-lined autoclave was charged with 1200 g of NMP and 322.0 g (1.915 moles) of hydrated sodium sulfide (water content: 53.6 wt. %). After the autoclave being purged with nitrogen gas, 250 g of an NMP solution, which contained 130 g of water, and 0.038 mole of hydrogen sulfide were distilled out while gradually heating the contents to 200° C.

Thereafter, a liquid mixture consisting of 224.2 g (1.525 moles) of p-dichlorobenzene, 126.2 g (0.355 mole) of 1,4-bis(4-chlorobenzoyl)benzene and 420 g of NMP was fed to react the contents at 220° C. for 5 hours. Then, 135 g (7.49 moles) of water was further introduced under pressure in the autoclave. The contents were heated to 255° C. to react them for 3 hours.

However, the resultant reaction mixture had a dark brown color and gave off an offensive odor. It was hence observed that decomposition reaction took place. Therefore, any copolymers could not be obtained.

COMPARATIVE EXAMPLE 2

As another comparative example, the following polymerization experiment was further performed in place of Example 1.

A titanium-lined autoclave was charged with 1000 g of NMP, 164.8 g (0.98 mole) of hydrated sodium sulfide (water content: 53.6 wt. %), 119.1 g (0.81 mole) of p-dichlorobenzene, 67.5 g (0.19 mole) of 1,4-bis(4-chlorobenzoyl)benzene and 90 g (5.0 moles) of water. Immediately after the autoclave being purged with nitrogen gas, the contents were heated from 100° C. to 260° C. over 1 hour under stirring, and then maintained at 260° C. for 3 hours to react them.

However, the resultant reaction mixture had a dark brown color and gave off an offensive odor. It was hence observed that decomposition reaction took place. Therefore, any copolymers could not be obtained.

COMPARATIVE EXAMPLE 3

As a comparative example, the following polymerization experiment was performed in place of Example 7 wherein a prepolymer having at least one terminal alkali thiolate group was prepared by depolymerization to react it with 4,4'-dichlorobenzophenone. Namely, a reaction was conducted by processing in the same manner as in Comparative Example 1 except that 85.4 g (0.34 mole) of 4,4'-dichlorobenzophenone instead of 1,4-bis(4-chlorobenzoyl)benzene and 226.4 g (1.54 moles) of p-dichlorobenzene were used in Comparative Example 1.

The resultant reaction mixture had a dark brown color and gave off an offensive odor. It was hence observed that decomposition reaction took place. Therefore, any satisfactory copolymers could not be obtained by this process.

COMPARATIVE EXAMPLE 4

The following copolymerization experiment was performed in place of Example 4.

A titanium-lined autoclave was charged with 1200 g of NMP and 336.0 g (2.00 moles) of hydrated sodium sulfide (water content: 53.6 wt. %). After the autoclave being purged with nitrogen gas, 310 g of an NMP solution, which contained 150 g of water, and 0.040 mole of hydrogen sulfide were distilled out while gradually heating the contents to 200° C.

After a liquid mixture consisting of 240.0 g (1.63 moles) of p-dichlorobenzene, 116.0 g (0.372 mole) of 4,4'-dibromobiphenyl and 460 g of NMP wa then fed to react the contents at 220° C. for 5 hours, 135 g (7.49 moles) of water was additionally introduced under pressure. The contents were then heated to 255° C. to react them for 3 hours.

The thus-obtained reaction mixture was treated in the same manner as in Example 1 to obtain a polymer (Polymer $R_4$) as white granules. Its melt viscosity was 5400 poises (at 310° C.). With respect to Polymer $R_4$ in the granular form after drying, plural melting points were observed at 220° C. and 241° C. unlike the polymer of Example 4. However, no melting point was observed on its quench-pressed sheet. Therefore, Polymer $R_4$ was substantially amorphous. A plurality of Tg were observed at about 102° C. and 166° C. It is therefore understood that Polymer $R_4$ is lacking in uniformity in composition unlike the polymer of Example 4.

COMPARATIVE EXAMPLE 5

As a further comparative example of Example 1, the same procedure as in Example 1 was repeated except that the liquid mixture containing PATE (A-1), NMP, hydrated sodium sulfide, calcium hydroxide and water was heated at 180° C. for 20 hours instead of heating at 240° C. for 2 hours to conduct depolymerization and alkali thiolate-forming reaction.

A considerable amount of undissolved polymer particles [particles of the raw PATE (A-1)] were observed in the reaction mixture after the alkali thiolate-forming reaction. However, the subsequent copolymerization process was advanced without any treatment, thereby obtaining a polymer (Polymer $R_5$) as brown powder.

As the result of DSC analysis of Polymer $R_5$, plural Tg and Tm were observed at 82° C. and 170° C. and at 282° C. and 410° C., respectively.

Judging from the above results, it is assumed that Polymer $R_5$ was a mixture composed substantially of two homopolymers of different kinds, and any copolymers could not be obtained.

COMPARATIVE EXAMPLE 6

As a still further comparative example of Example 1, the depolymerization was conducted at 240° C. by using a liquid mixture, whose pH had been adjusted by adding a small amount of acetic acid, instead of using the liquid mixture containing PATE (A-1), NMP, hydrated sodium sulfide, calcium hydroxide and water as it is.

The pH of an aqueous solution obtained by diluting this liquid mixture with water in an amount 100 times the weight of the mixture was 8.3.

It was however observed that the reaction mixture turned dark brown and gave off an offensive odor and hence, decomposition reaction took place, so that the subsequent processes were discontinued.

COMPARATIVE EXAMPLE 7

Synthesis of PATE Prepolymer

A titanium-lined reactor was charged with 2.26 kg (13.44 moles) of hydrated sodium sulfide (water content: 53.6 wt. %) and 5.0 kg of NMP. After the reactor being purged with nitrogen gas, 1.04 kg of an NMP solution, which contained 0.86 kg of water, and 0.35 mole of hydrogen sulfide were distilled out while gradually heating the contents to 187° C.

Thereafter, 1.72 kg (11.70 moles) of p-dichlorobenzene and 1.67 kg of NMP was fed to react the contents at 220° C. for 10 hours (p-dichlorobenzene/sodium sulfide=0.9 mol/mol; water content/NMP=3 mol/kg).

Synthesis of Block Copolymer

The titanium-lined reactor with 9.57 kg of the reaction slurry containing the PATE prepolymer was charged with 0.30 kg (1.769 moles) of hydrated sodium sulfide (water content: 54.0 wt. %), 0.81 kg (3.227 moles) of 4,4'-dichlorobenzophenone, 3.28 kg of NMP and 1.28 kg (71.11 moles) of water. After the reactor being purged with nitrogen gas, the contents were heated to polymerize them at 260° C. for 2 hours.

The resultant reaction mixture in the form of a slurry was diluted with a substantially equiamount of NMP and the granular polymer thus obtained was collected by a screen having an opening size of 150 μm (100 mesh). The polymer was washed three times with methanol and further three times with water, and then dried at 100° C. for 24 hours, thereby obtaining Block Copolymer $R_7$. The collection rate of Block Copolymer $R_7$ was 78%.

Physical Properties of Polymer

Physical properties of Polymer $R_7$ thus obtained were as followed:

Percent reduction in ΔHmc: 44%

Tm: 293° C. (the granular copolymer after drying showed melting peaks Tm at 304° C. and 335° C.)

Tg: 106° C.

$\eta^*$: 740 poises (at 370° C.)

Sodium ions: 410 ppm.

Average composition:

$$-\!\!\left[\left(\!\!\bigcirc\!\!\right)\!\!-\!\!S\right]_{\!37}\!\!-\!\!\left(\!\!\bigcirc\!\!\right)\!\!-\!\!CO\!\!-\!\!\left(\!\!\bigcirc\!\!\right)\!\!-\!\!S\!\!-\!\!$$

EXAMPLE 8

Depolymerization and Alkali Thiolate-Forming Reaction

A titanium-lined autoclave was charged with 81.0 g (0.75 basal mole) of a PATE ("FORTRON #W214", trade mark, product of Kureha Chemical Industry Co., Ltd.), 500 g of NMP, 42.3 g (0.25 mole) of hydrated sodium sulfide (water content: 53.9 wt. %), 1.6 g (0.04 mole) of sodium hydroxide and 40.2 g (2.2 moles) of water to prepare a liquid mixture (water content/NMP =7 mole/kg). The pH of an aqueous solution obtained by diluting a small amount of the liquid mixture sample with water in an amount 100 times the weight of the sample was 12.0.

The liquid mixture was heated at 255° C. for 1 hour while stirring it in a nitrogen gas atmosphere, thereby conducting depolymerization and alkali thiolate-forming reaction. The amount of sodium sulfide remaining in the reaction mixture was 46%. The melt viscosity of the thiol-containing product was lower than 50 poises (at 310° C.) as against 1450 poises of the raw PATE.

Preparation of Low-Molecular Weight Poly(ketone Thioether)

A titanium-lined autoclave was charged with 556 g of NMP, 32.0 g (0.189 mole) of hydrated sodium sulfide (water content: 53.9 wt. %), 126.8 g (0.505 mole) of 4,4'-dichlorobenzophenone and 52.8 g (2.93 moles) of water. After the autoclave being purged with nitrogen gas, the contents were reacted at 220° C. for 1 hour under stirring (water content/NMP=7 mole/kg). The amount of sodium sulfide remaining in the reaction mixture was 0%.

The polymerization degree of the low-molecular weight poly(ketone thioether) obtained in the same manner as in Example 5 was 5 or lower in terms of m in the dihalogen-substituted aromatic compound represented by the general formula [II].

Copolymerization Reaction

A titanium-lined autoclave was charged with 438.2 g (corresponding to 0.494 basal mole of the PATE) of the reaction mixture [containing 0.089 mole of a prepolymer (B) and 0.076 mole of sodium sulfide], which had been obtained by conducting the alkali thiolate-forming reaction, and 383.8 g of the low-molecular weight poly(ketone thioether)-containing reaction mixture. After the autoclave being purged with nitrogen gas, the contents were reacted at 265° C. for 30 minutes under stirring (water content/NMP=7 mole/kg). The reactor was cooled to 240° C., and a liquid mixture consisting of 7.5 g of 4,4'-dichlorobenzophenone, 50 g of NMP and 6.3 g of water was introduced under pressure to react the contents for 30 minutes, thereby conducting end-capping. The resultant reaction mixture was treated in the same manner as in Example 1, thereby obtaining a granular polymer (Polymer P8) having an average particle size of about 500 μm with a yield of 73%.

Physical Properties of Polymer

Physical properties of Polymer P8 thus obtained were as followed:
Percent reduction in ΔHmc: 15%
Tm: 310° C. (the granular copolymer after drying had a Tm of 326° C. and showed a single peak)
Tg: 115° C.
η*: 570 poises (at 370° C.)
Sodium ions: 230 ppm.
Average composition:

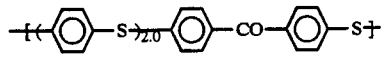

We claim:

1. A process for the production of an arylene thioether copolymer (C), which comprise causing an alkali metal sulfide to act on a poly(arylene thioether) (A) having predominant recurring units of this formula [I]:

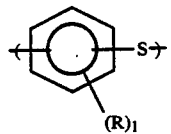

wherein R denotes an alkyl group having 1-6 carbon atoms, and 1 stands for 0 or an integer of 1-4, in a water-containing polar organic solvent so as to depolymerize the poly(arylene thioether) (A), the mixture comprising the water-containing polar organic solvent, the poly(arylene thioether) (A) and the alkali metal sulfide being alkalified by adding a basic compound to such an extent that the pH of an aqueous solution obtained by diluting the mixture with water in an amount 100 times the weight of the mixture is 9 or higher, thereby preparing a prepolymer (B) having an alkali thiolate group on at least one terminal thereof, and then subjecting the resultant prepolymer (B) and optionally, an alkali metal sulfide to a polymerization reaction with at least one compound selected from dihalogen-substituted aromatic compounds represented by the following general formulae [II] through [V]:

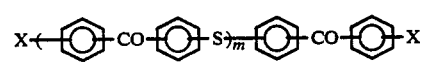

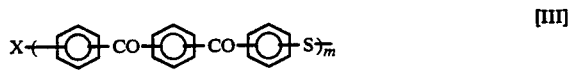

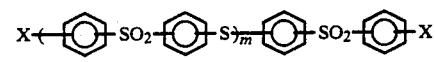

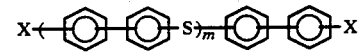

wherein m stands for 0 or an integer of 1-100, and X means a halogen atom, in a water-containing polar organic solvent.

2. The process as claimed in claim 1, wherein the prepolymer (B) having an alkali thiolate group on at least one terminal has been obtained by subjecting a mixture comprising:

(a) a polar organic solvent containing water in a proportion of 0.1-20 moles per kg of the polar organic solvent;

(b) a poly(arylene thioether) (A) in a proportion of 0.1-5 basal moles per kg of the polar organic solvent, wherein the term "basal mole" means the number of moles, which has been calculated supposing the sum of atomic weights of elements constituting the recurring unit [I] is 1 gram molecule; and (c) an alkali metal sulfide in a proportion of 0.01-1 mole per basal mole of the poly(arylene thioether) (A) to a depolymerization reaction at 200°-300° C. for 0.1-30 hours.

3. The process as claimed in claim 1, wherein the basic compound is at least one compound selected from the hydroxides, oxides and carbonates of alkali metals or alkaline earth metals and is contained in a proportion of 0.001–1 mole per basal mole of the poly(arylene thioether) (A).

4. The process as claimed in claim 1, wherein the polymerization reaction of the prepolymer (B) and said at least one compound selected from the dihalogen-substituted aromatic compounds represented by the general formulae [II] through [V] in the water-containing polar organic solvent is conducted by either using the prepolymer (B) in the form of an isolated product obtained by causing the alkali metal sulfide to act on the poly(arylene thioether) (A) in the water-containing polar organic solvent so as to depolymerize the poly(arylene thioether) (A) and then separating the prepolymer (B) from the reaction mixture under non-oxidizing conditions or employing the reaction mixture containing the prepolymer (B) as it is.

5. The process as claimed in claim 4, wherein the reaction mixture after the alkali metal sulfide is caused to act o the poly(arylene thioether) (A) in the water-containing polar organic solvent so as to depolymerize the poly(arylene thioether) (A) is partially neutralized by adding a proton acid and/or a salt of a strong acid and a weak base to use the reaction mixture as it is.

6. The process as claimed in claim 1, wherein the dihalogen-substituted aromatic compound is at least one compound selected from compounds represented by the following general formulae [VI] through [IX]:

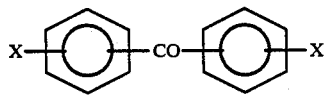
[VI]

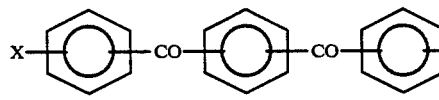
[VII]

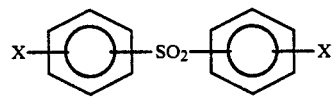
[VIII]

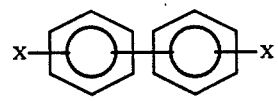
[IX]

wherein X means a halogen atom.

7. The process as claimed in claim 1, wherein the poly(arylene thioether) (A) to be subjected to the depolymerization has been obtained by subjecting an alkali metal sulfide and a dihalogen-substituted aromatic compound, which consists principally of a compound represented by the following general formula [X]:

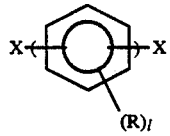
[X]

wherein X means a halogen atom, R denotes an alkyl group having 1–6 carbon atoms, and 1 stands for 0 or an integer 1–4, in a proportion of 0.9–1.1 moles per mole of the alkali metal sulfide to a polymerization reaction in a water-containing polar organic solvent, and is used either in the form isolated from the reaction mixture or in the form of a reaction mixture without separating the poly(arylene thioether) (A).

8. A process for the preparation of a prepolymer (B) having an alkali thiolate group on at least one terminal thereof, which comprises causing an alkali metal sulfide to act on a poly(arylene thioether) (A) having predominant recurring units of the formula [I]

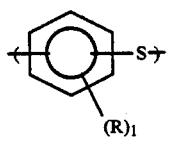
[I]

wherein R denotes an alkyl group having 1–6 carbon atoms, and 1 stands for 0 or an integer of 1–4, in a polar organic solvent containing water under the following conditions:
 (a) the water content in the polar organic solvent being 0.1–20 moles per kg of the polar organic solvent;
 (b) the proportion of the poly(arylene thioether) (A) being 0.1–5 basal moles per kg of the polar organic solvent, wherein the term "basal mole" means the number of moles, which has been calculated supposing the sum of atomic weights of elements constituting the recurring unit [I] is 1 gram molecule;
 (c) the proportion of the alkali metal sulfide being 0.01–1 mole per basal mole of the poly(arylene thioether) (A); and
 (d) the mixture comprising the water-containing polar organic solvent, the poly(arylene thioether) (A) and the alkali metal sulfide being alkalified by adding a basic compound to such an extent that the pH of an aqueous solution obtained by diluting the mixture with water in an amount 100 times the weight of the mixture is 9 or higher,
thereby depolymerizing the poly(arylene thioether) (A).

9. The process as claimed in claim 1, wherein the reaction of the alkali metal sulfide and the poly(arylene thioether) is conducted at 235°–280° C.

10. The process as claimed in claim 8, wherein the reaction of the alkali metal sulfide and the poly(arylene thioether) is conducted at 235°–280° C.

* * * * *